United States Patent
Kim et al.

(10) Patent No.: US 11,893,392 B2
(45) Date of Patent: Feb. 6, 2024

(54) MULTI-PROCESSOR SYSTEM AND METHOD FOR PROCESSING FLOATING POINT OPERATION THEREOF

(71) Applicant: ELECTRONICS AND TELECOMMUNICATIONS RESEARCH INSTITUTE, Daejeon (KR)

(72) Inventors: Ju-Yeob Kim, Daejeon (KR); Jin Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/538,147

(22) Filed: Nov. 30, 2021

(65) Prior Publication Data
US 2022/0171631 A1    Jun. 2, 2022

(30) Foreign Application Priority Data

Dec. 1, 2020 (KR) .......................... 10-2020-0165633
Nov. 19, 2021 (KR) .......................... 10-2021-0160680

(51) Int. Cl.
*G06F 9/30* (2018.01)
*G06F 9/38* (2018.01)

(52) U.S. Cl.
CPC ........ *G06F 9/3885* (2013.01); *G06F 9/30036* (2013.01); *G06F 9/3887* (2013.01)

(58) Field of Classification Search
CPC .... G06F 9/3885; G06F 9/30036; G06F 15/80; G06F 9/3887
See application file for complete search history.

(56) References Cited

U.S. PATENT DOCUMENTS

| | | | |
|---|---|---|---|
| 8,078,835 B2 * | 12/2011 | Yang | G06F 7/57 |
| | | | 712/229 |
| 10,140,129 B2 | 11/2018 | Pardo et al. | |
| 10,740,167 B2 | 8/2020 | Han et al. | |
| 2010/0077177 A1 * | 3/2010 | Luick | G06F 9/3853 |
| | | | 712/28 |
| 2016/0077802 A1 | 3/2016 | Samudrala et al. | |
| 2017/0052891 A1 | 2/2017 | Pak et al. | |
| 2018/0253639 A1 * | 9/2018 | Snelgrove | G06F 13/4022 |
| 2019/0121679 A1 * | 4/2019 | Wilkinson | G06F 9/30087 |

FOREIGN PATENT DOCUMENTS

| | | |
|---|---|---|
| JP | 2010-073197 | 4/2010 |
| KR | 10-2009-0027184 | 3/2009 |
| KR | 10-2011-0073714 | 6/2011 |
| KR | 10-2020-0129666 | 11/2020 |

* cited by examiner

*Primary Examiner* — Corey S Faherty
(74) *Attorney, Agent, or Firm* — KILE PARK REED & HOUTTEMAN

(57) ABSTRACT

A method for processing floating point operations in a multi-processor system including a plurality of single processor cores is provided. In this method, upon receiving a group setting for performing an operation, the plurality of single processor cores are grouped into at least one group according to the group setting, and a single processor core set as a master in the group loads an instruction for performing the operation from an external memory, and performs parallel operations by utilizing floating point units (FUPs) of all single processor cores in the group according to the instructions.

11 Claims, 6 Drawing Sheets

MULTI-PROCESSOR SYSTEM AND METHOD FOR PROCESSING FLOATING POINT OPERATION THEREOF

CROSS-REFERENCE TO RELATED APPLICATION

This application claims priority to and the benefit of Korean Patent Application Nos. 10-2020-0165633 and 10-2021-0160680 filed in the Korean Intellectual Property Office on Dec. 1, 2020 and Nov. 19, 2021, the entire contents of which are incorporated herein by reference.

BACKGROUND OF THE INVENTION

(a) Field of the Invention

The present disclosure relates to a multi-processor system and a method for processing a floating point operation thereof. More particularly, the present disclosure relates to a multi-processor system and a method for processing a floating point operation capable of reducing the frequency of access to external memory for vector and matrix operations of large sizes, by sharing floating point operators of single processor cores in a multi-processor system.

(b) Description of the Related Art

With the development of semiconductor process technology, a large number of processor cores are mounted and operated in a single chip.

Recently, as the operation resources of multi-core processors are frequently used in fields such as artificial intelligence and deep learning, as a method of effectively utilizing the hardware operator resources of the multi-core processor, a method of characterizing the operators inside single processor cores constituting the multi-core processor is being used. For example, tasks such as adding the BF16 operator operators that did not exist before or integrating byte-unit operators are being done. Due to these tasks, multi-core processor suitable for operation tasks of artificial intelligence and deep learning are being announced. In particular, it is developing in a way that expands the operation scale of vectors and matrices that can be processed in a unit processor core, and since vectors and matrices of a large size can be implemented with one instruction set at a time, overall processing performance tends to increase compared to the existing one. However, this improvement method cannot be pursued any longer in the near future when the semiconductor process cannot be upgraded immediately.

When the operation scale of one vector and matrix exceeds the computational limit of a single processor core constituting the inside of the multi-core processor, one vector and matrix operation is distributed and processed to the plurality of single processor cores inside the multi-core processor. Specifically, a vector and matrix are decomposed into small-sized vectors and matrices that can be processed by single processor cores in consideration of the structure and mathematical decomposition of multi-core processor, and the decomposed vectors and matrices are allocated into single processor cores, are processed by the single processor cores, and then the operation results of single processor cores are combined.

In this conventional method, although the operator resources that can be processed at one time are sufficient or the decomposition into small units can be minimized in terms of the overall chip of the multi-core processor, the entire processing process is determined by the operation ability of a single processor core, and since the instruction set of single processor cores must be added for vector and matrix operations decomposed into small units, the overall performance of the system deteriorates. In addition, since the added instruction sets needs to be fetched from the external memory, the frequency of access to the external memory increases.

SUMMARY OF THE INVENTION

The present invention has been made in an effort to provide multi-processor system and a method for processing floating point operation thereof capable of reducing additional loading of instruction sets and frequency of access to an external memory occurred to the limitation of the operation abilities of single processor cores constituting the multi-processor system.

According to an embodiment of the present disclosure, a method for processing floating point operations in a multi-processor system including a plurality of single processor cores is provided. The method for processing floating point operations includes: receiving a group setting for performing an operation; loading, by a single processor core set as a master in a group, instructions for performing the operation from an external memory, when the plurality of single processor cores are grouped into at least one group according to the group setting; and performing, by the single processor core set as the master, parallel operations on the data to be operated by using floating point units (FUPs) of all single processor cores in the group according to the instructions.

The performing of the parallel operations may include acquiring, by the single processor core set as the master, control rights of the functional blocks necessary for the operation of the FPUs from the remaining processor cores in the group, and controlling the functional blocks of the remaining processor cores.

The performing of the parallel operations may include activating, by the single processor core set as the master, interfaces which are physically connected to the remaining processor cores in the group.

The method for processing floating point operations may further include transitioning, by the remaining single processor cores other than the master, functional blocks not related to the operation of the FPUs to an inactive state.

The performing of the parallel operation may include providing, by the single processor core set as the master, data necessary for the operation of the FPUs to the remaining processor cores in the group.

The group setting may include the type and number of single processor cores constituting the group, and single processor core information corresponding to the master.

According to another embodiment, a multi-processor system for processing floating point operation is provided. The multi-processor system includes a plurality of single processor cores including a controller and a floating point unit (FUP), wherein after the controller of the single processor core set as the master in any one group in which two or more single processor cores are grouped according to the group setting for performing the operation loads instructions for performing the operation, and performs parallel operations on data to be operated by utilizing the FPUs of the remaining single processor cores in the group according to the instructions.

The controller of the single processor core set as the master according to the group setting may acquire control rights of the functional blocks necessary for the operation of the FPUs from the remaining processor cores in the group, and may control the functional blocks.

The controller of the remaining single processor cores other than the master in the group may transition functional blocks not related to the operation of the FPUs to an inactive state according to the group setting.

The controller of each of the plurality of single processor cores may include a data cache for storing all data necessary for the operation of the FPUs; and a cache and register controller that fetches data necessary for the operation of the FPU from the data cache in each cycle and stores it in a plurality of registers for the each cycle, wherein the controller of the single processor core set as the master may activate interfaces between the cache and register controller of single processor core set as the master and the cache and register controllers of the remaining single processor cores in the group The cache and register controller of single processor core set as the master may transfer instructions to be operated by the remaining single processor cores to the cache and register controllers of the remaining single processor cores in the group through the activated interfaces.

DETAILED DESCRIPTION OF THE EMBODIMENTS

Figure 1:
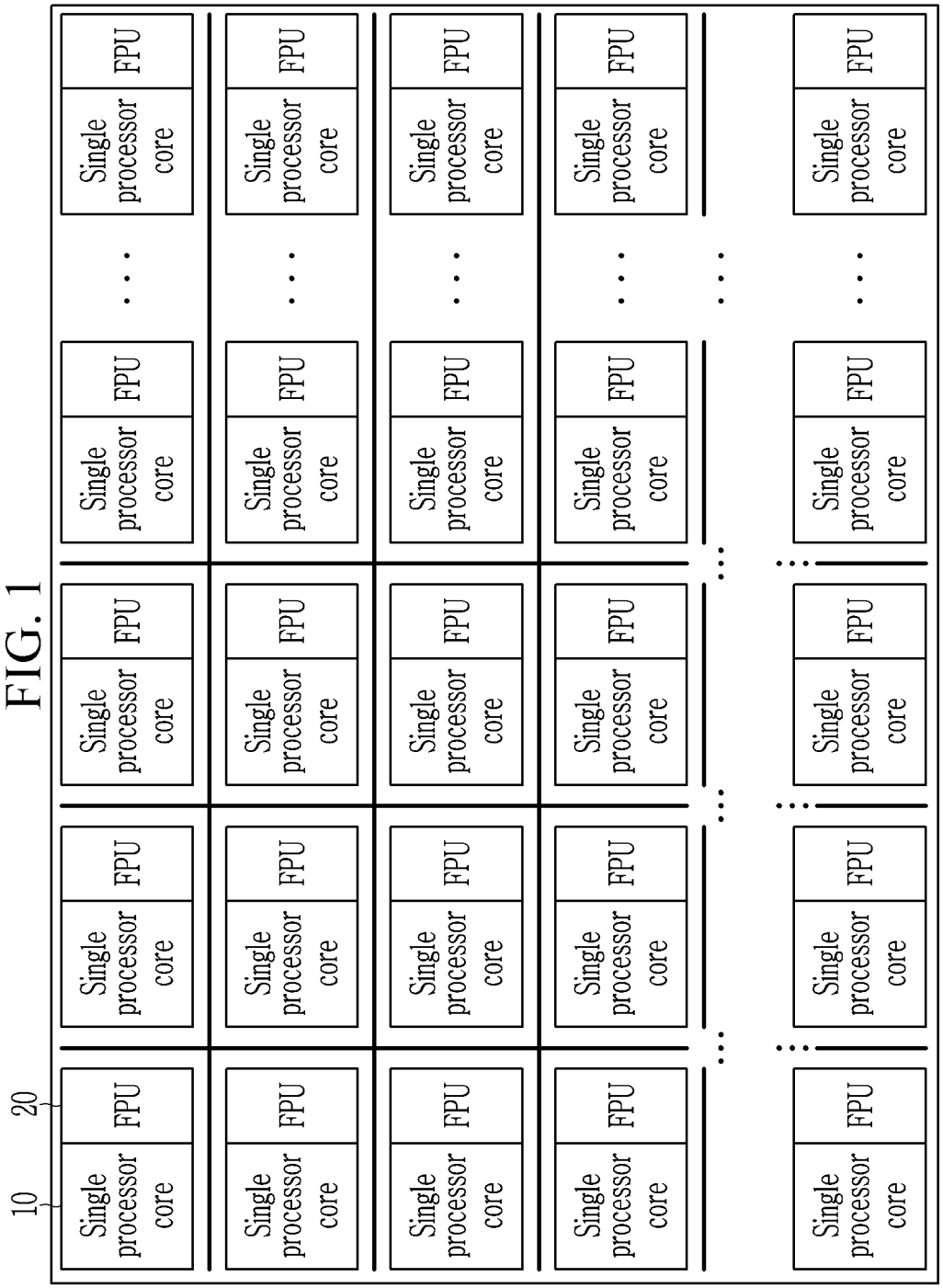
FIG. 1 is a diagram schematically illustrating a multi-processor system to which an embodiment is applied.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a multi-processor system and a method for processing floating point operation thereof according to an embodiment will be described in detail with reference to the drawings.

FIG. 1 is a diagram schematically illustrating a multi-processor system to which an embodiment is applied.

Referring to FIG. 1, a multi-processor system includes a plurality of single processor cores 10 in one chip. Each single processor core 10 includes a floating point unit (FUP) 20 for efficiently processing floating point operations.

Figure 2:
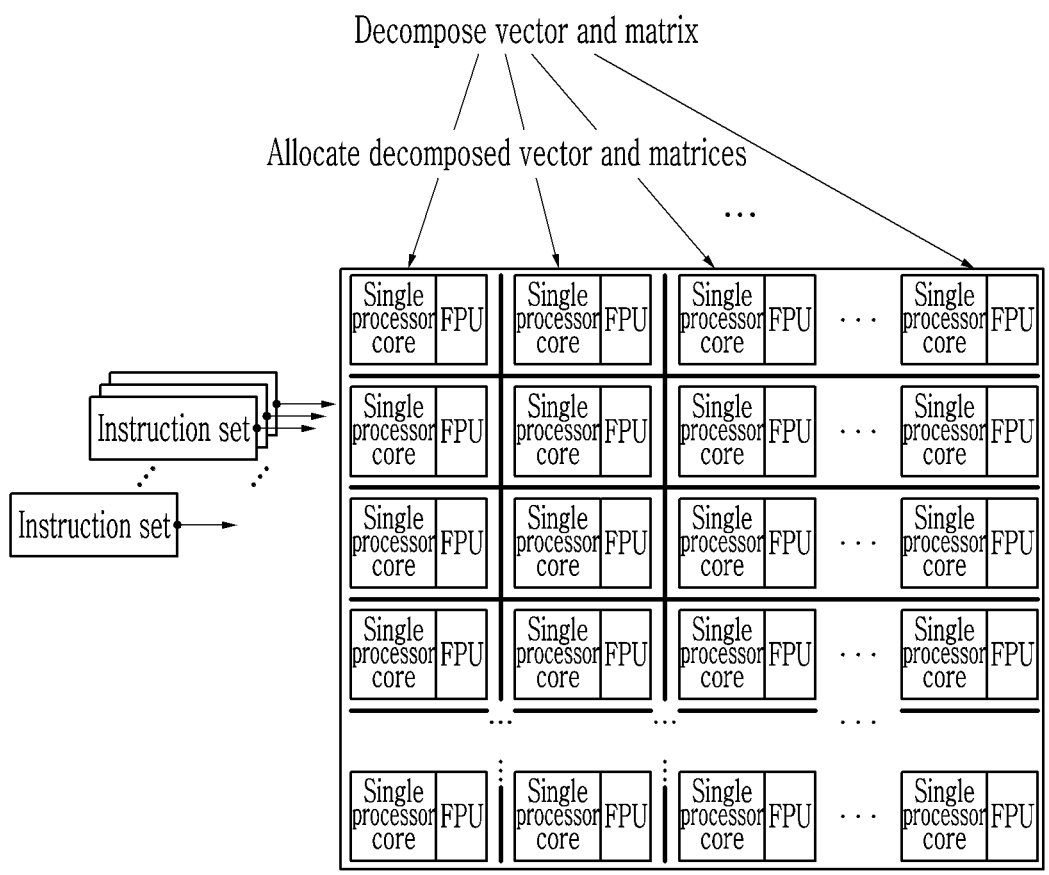
FIG. 2 is a diagram illustrating an example of a method for processing a large-capacity operation in a conventional multi-processor system.

FIG. 2 is a diagram illustrating an example of a method for processing a large-capacity operation in a conventional multi-processor system.

Referring to FIG. 2, large-sized vector and matrix operations are distributed and processed to a plurality of single processor cores in a multi-processor core system according to the operation ability of a single processor core.

The large-sized vector and matrix are equally decomposed into smaller sizes to fit the number of single processor cores in one chip, and the decomposed vectors and matrices are allocated to single processor cores. Assuming that the matrix operation A×B to be processed throughout the system is 1000×1000 and there are 10 single processor cores, the matrix operation A×B is decomposed into 10 100×100 matrices, and 10 100×100 matrices may be allocated to 10 single processor cores.

The plurality of single processor cores simultaneously perform operations on allocated vectors and matrices. For this, each single processor core fetches an instruction set for the operation of the allocated vector and matrix. A patch represents the process of outputting instructions from an external memory.

In such a method for processing large-sized operation of a multi-processor system, similar or identical instruction sets must be loaded into individual single processor cores. That is, the instruction set required for each single processor core is redundantly required, which increases the frequency of access to the external memory, so the operation processing speed is slowed, and the overall performance of the system is deteriorated.

In the embodiment, by sharing the FPU possessed by each single processor core between single processor cores, one single processor core operates the FPUs of another single processor cores as its own FPU.

Figure 3:
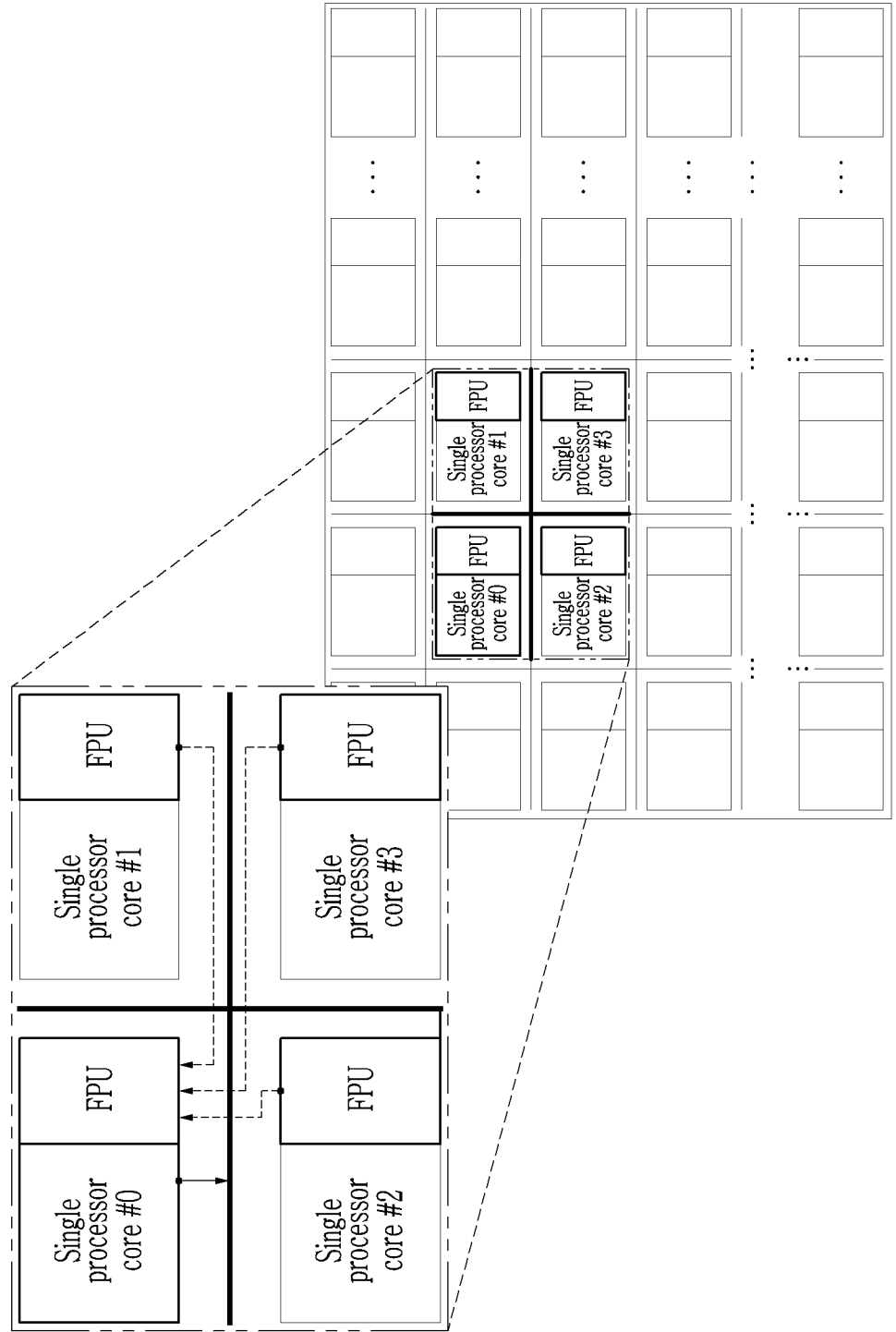
FIG. 3 is a diagram conceptually illustrating a method for processing a floating point operation of a multi-processor system according to an embodiment.

FIG. 3 is a diagram conceptually illustrating a method for processing a floating point operation of a multi-processor system according to an embodiment.

Referring to FIG. 3, a plurality of single processor cores in one chip are grouped into at least one group for processing large-sized vector and matrix operation, and one single processor core in the group uses the FPUs in the other single processor cores as its own FPU.

That is, FPUs in single processor cores that are physically different from each other can be logically used as FPUs in a single processor core.

In this case, the single processor core using the FPUs in the other single processor cores has the sharing right and control right of the FPUs of the other single processor cores. To this end, single processor cores in a multi-processor system are hardware-connected through interfaces, and connections between single processor cores are set through activation of these interfaces, and FPUs of other single processor cores can be controlled.

For example, assuming that a single processor core #0, a single processor core #1, a single processor core #2, and a single processor core #3 are a group, the single processor core #0 uses its own FPU as well as the FPUs of the single processor core #1, the single processor core #2, and the single processor core #3, has the effect of expanding the FPUs.

In this way, since the instruction set is loaded only on the single processor core #0 for the large-sized vector and matrix operation, the frequency of accessing the external memory can be significantly reduced compared to the method of FIG. 2.

Figure 4:
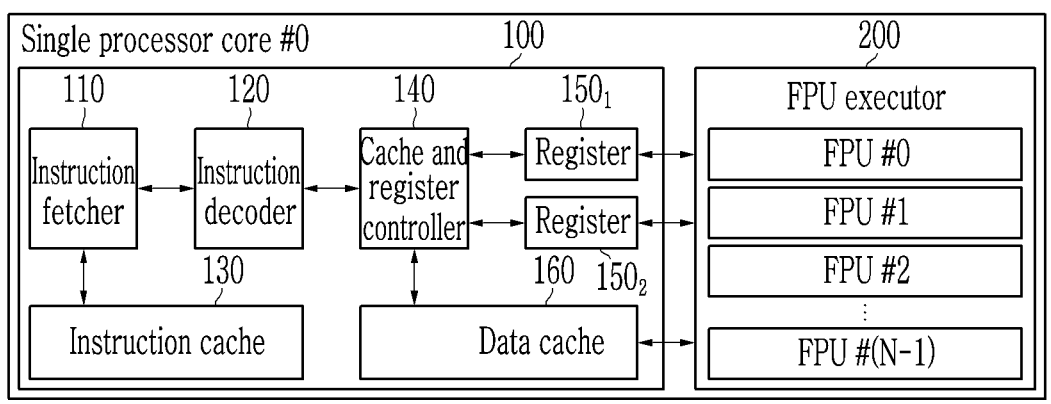
FIG. 4 is a diagram illustrating a configuration of a single processor core according to an embodiment.

FIG. 4 is a diagram illustrating a configuration of a single processor core according to an embodiment.

Referring to FIG. 4, the single processor core #0 includes the controller 100 and the FPU executor 200 including a plurality of FPUs.

The controller 100 includes an instruction fetcher 110, an instruction decoder 120, an instruction cache 130, a cache and register controller 140, a plurality of registers 1501 and 1502, and a data cache 160.

The instruction fetcher 110 fetches an instruction set for an operation to be performed by the single processor core #0 and stores the instruction set in the instruction cache 130.

The instruction decoder 120 decodes the instruction. The instruction decoder 120 interprets the command received from the instruction fetcher 110 and transmits it to the cache and register controller 140.

The cache and register controller 140 fetches data required in the next cycles by the FPU executor 200 from the data cache 160 and alternately stores the data required in the next cycles in a plurality of registers 1501 and 1502.

The registers 1501 and 1502 store data to be operated in the next cycles by the FPU executor 200, for example, values of operands. That is, data to be operated in the next cycles by the FPU executor 200 are alternately stored in the registers 1501 and 1502 for each cycle.

The data cache 160 stores all data necessary for an operation to be performed by a single processor core #0. In addition, the data cache 160 may store the operation results of the FPUs of the FPU executor 200.

The FPU executor 200 performs an operation by a plurality of FPUs for each cycle, and stores the operation result in the data cache 160. The plurality of FPUs may be, for example, an addition operator, a subtraction operator, a multiplication operator, and a division operator. In the FIG. 4, FPU #0, FPU #1, FPU #(N−1) may indicate types of operators such as addition, subtraction, multiplication, and division.

As described in FIG. 3, when a single processor core #0 has the sharing rights and control rights of the FPUs of the other single processor core #1, the single processor core #2, and the single processor core #3, the cache, and register controller 140 of the single processor core #0 is connected to the cache and register controllers 140 of the single processor core #1, the single processor core #2, and the single processor core #3. The cache and register controller 140 of the single processor core #0 controls the cache and register controllers 140 of the other single processor core #1, the single processor core #2, and the single processor core #3, and uses the FPUs of the single processor core #1, the single processor core #2, and the FPU of the single processor core #4.

As such, when one single processor core shares the FPUs of single processor cores in the group, for convenience, the single processor core is referred to as a master processor core, and single processor core #0 becomes the master processor core.

Figure 5:
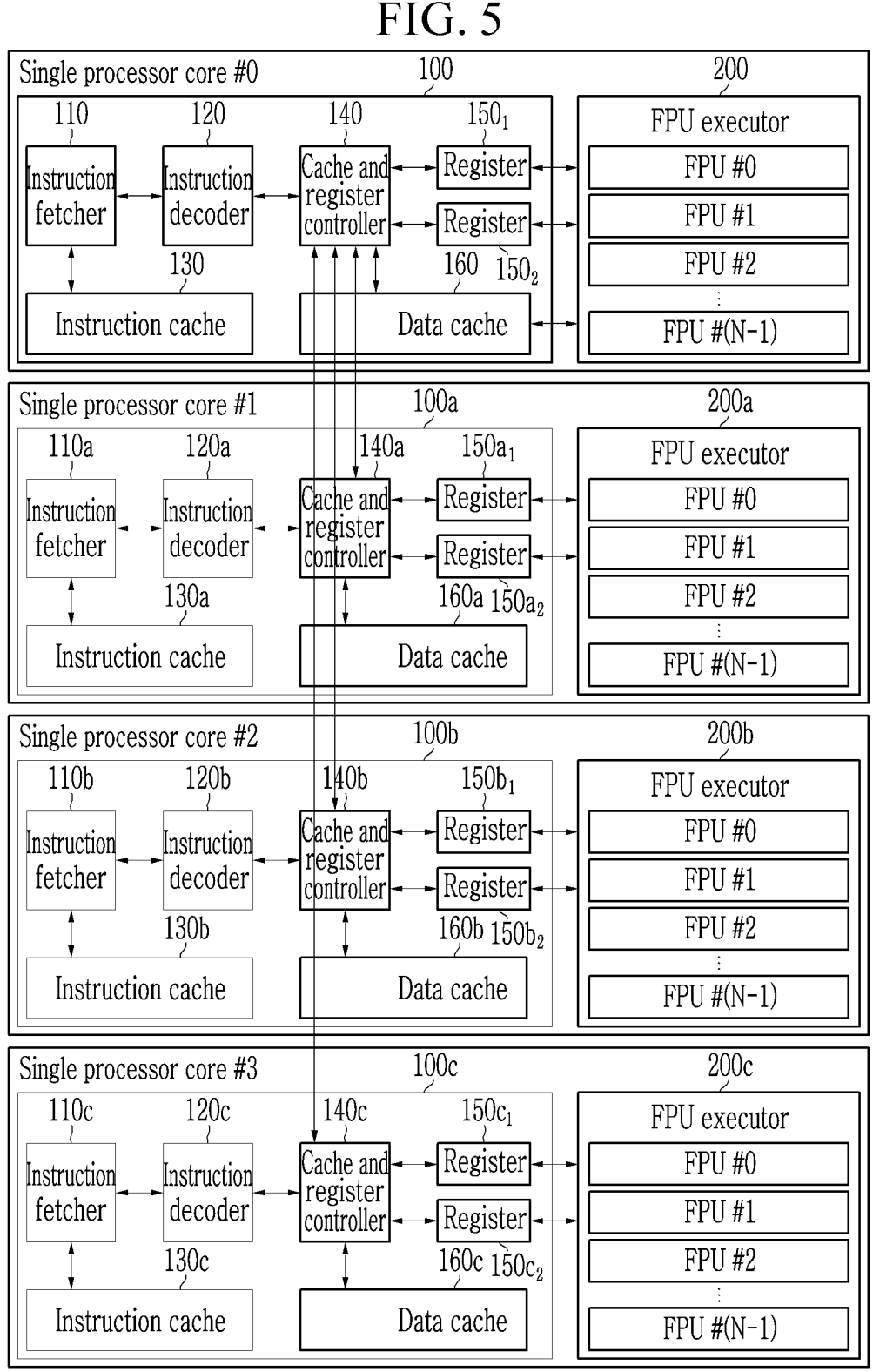
FIG. 5 is a diagram illustrating a connection structure of a controller for sharing FPUs between single processor cores according to an embodiment.

FIG. 5 is a diagram illustrating a connection structure of a controller for sharing FPUs between single processor cores according to an embodiment.

As shown in FIG. 5, the controller 100 of the single processor core #0 becomes the master within the group and is activated for vector and matrix operation.

On the other hand, the controllers 100a, 100b, and 100c of the single processor core #1, the single processor core #2, and the single processor core #3 return control rights to the single processor core #0 and are deactivated. At this time, single processor core #0 uses the FPUs of the single processor core #1, the single processor core #2, and the single processor core #3 for vector and matrix operation, so the controllers 100a, 100b, and 100c of the single processor core #1, single processor core #2, and the single processor core #3 of transition instruction fetcher 110a, 110b, and 110c, the instruction decoders 120a, 120b and 120c, and the instruction caches 130a, 130b, and 130c that are not required for operation of the FPUs to a disabled state or a low-power state, respectively.

The controller 100 of the single processor core #0, which is the master, activates interfaces between the cache and the register controller 140 and the cache and the register controllers 140a, 140b, and 140c of the single processor core #1, the single processor core #2, and the single processor core #3.

The cache and the register controller 140 of the single processor core #0 transfers the instructions to the cache and the register controllers 140a, 140b, and 140c of single processor core #1, the single processor core #2, and the single processor core #3 via an enabled interfaces, and executes the FPUs of the single processor core #1, the single processor core #2, and the single processor core #3.

In this way, the single processor core #0 performs a parallel operation by using FPUs shared from single processor core #1, the single processor core #2, and the single processor core #3 together with its own FPU. Because of this, there is no need for instructions to be loaded in the single processor core #1, the single processor core #2, and the single processor core #3 in the operation process that had to be performed by decomposing it into the single processor core #1, the single processor core #2, and the single processor core #3 for large-sized operations, and the single processor core #0 can perform large-sized vector and matrix operations with one instruction set or a minimized instruction set.

Figure 6:
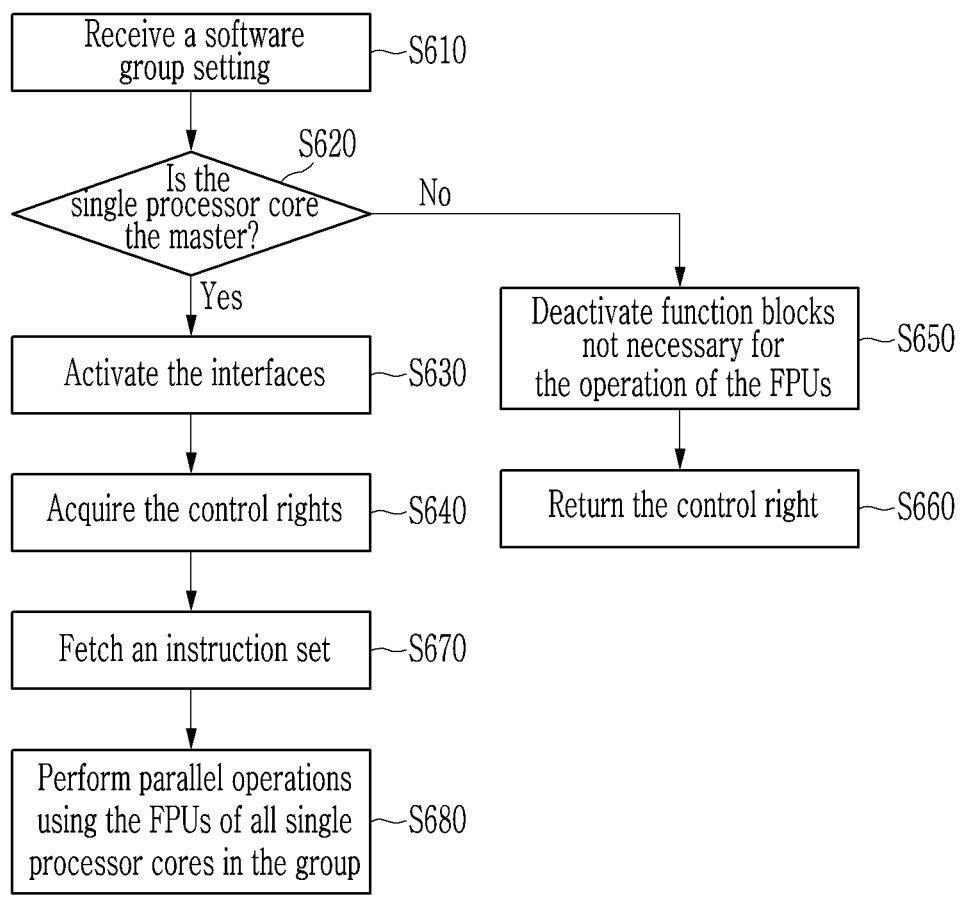
FIG. 6 is a flowchart illustrating a method for processing a floating-point operation of a single processor core according to an embodiment.

FIG. 6 is a flowchart illustrating a method for processing a floating-point operation of a single processor core according to an embodiment.

Referring to FIG. 6, a single processor core receives a software group setting (S610). The group setting may include group information and master status information. The group information may include the type and number of single processor cores constituting the group. The master status information may include single processor core information performing main control, that is, single processor core information corresponding to the master.

The single processor core checks whether it is the master having control rights from the software setting (S620).

The single processor core, which becomes the master from the software setting, activates the interfaces between the internal cache and the register controller and the cache and register controllers of other single processor cores constituting the group (S630), and acquires the control rights of the functional blocks necessary for operation of the FPUs in the single processor cores constituting the group (S640), and controls the functional blocks of the single processor cores constituting the group.

On the other hand, from the software group setting, the other single processor cores except for the master deactivate function blocks not necessary for the operation of the FPUs (S650), and returns the control right of the function blocks necessary for the operation of the FPUs to the single processor core that becomes the master (S660).

The controller of the single processor core, which becomes the master, fetches an instruction set for an operation to be performed (S670) and interprets the instruction set. The controller of the single processor core, which becomes the master, fetches the instruction set and then loads the data needed for the operation.

The controller of the single processor core, which becomes the master, performs parallel operations using the FPUs of all single processor cores in the group through the interfaces activated between the cache and register controllers according to the instructions of the instruction set (S680). The controller of the single processor core becoming the master transfers the instruction set and data to be operated by each single processor core to the cache and register controller of each single processor core in the group through the interfaces activated between the cache and register controllers, and the single processors in the group execute the FPUs according to the instruction set received through the enabled interfaces, respectively. In this way, the single processor core that becomes the master has the effect of operating the FPUs of another single processor cores in the group as its own FPU.

As a result, since the instruction set from the external memory needs to be fetched only from the single processor core that becomes the master for large-sized operation, the number of accesses from the single processor core to the external memory for instruction fetching is greatly reduced.

According to an embodiment, it is possible to reduce additional loading of instruction sets and frequency of access to an external memory occurred to the limitation of the operation abilities of single processor cores constituting the multi-processor system when a large-sized vector and matrix operation is performed. This may reduce system performance degradation and power consumption.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the invention. It will be apparent to one of ordinary skill in the art that various modifications of the embodiments may be made without departing from the spirit and scope of the claims and their equivalents.

What is claimed is:

1. A method for processing floating point operations in a multi-processor system including a plurality of single processor cores, the method comprising:
   receiving a group setting for performing an operation;
   when the plurality of single processor cores are grouped into at least one group according to the group setting, loading, by a single processor core that is set as a master among single processor cores in a group of the at least one group, instructions for performing the operation from an external memory; and
   performing, by the single processor core that is set as the master, parallel operations on data to be operated by using floating point units (FPUs) of all single processor cores in the group according to the instructions.

2. The method of claim 1, wherein the performing of the parallel operations includes, by the single processor core that is set as the master, acquiring control rights of the functional blocks necessary for the operation of the FPUs from other single processor cores in the group and controlling the functional blocks of the other single processor cores.

3. The method of claim 1, wherein the performing of the parallel operations includes activating, by the single processor core that is set as the master, interfaces which are physically connected to other single processor cores in the group.

4. The method of claim 1, further comprising transitioning, by single processor cores, which are other than the single processor core that is set as the master, in the group, functional blocks not related to the operation of the FPUs to an inactive state.

5. The method of claim 1, wherein the performing of the parallel operation includes providing, by the single processor core that is set as the master, data necessary for the operation of the FPUs to other single processor cores in the group.

6. The method of claim 1, wherein the group setting includes the type and number of single processor cores of the group, and single processor core information corresponding to the master.

7. A multi-processor system for processing floating point operation, the multi-processor system comprising
   a plurality of single processor cores including a controller and a floating point unit (FPU),
   wherein a controller of a single processor core that is set as a master in any one group in which two or more single processor cores are grouped according to a group setting for performing the operation loads instructions for performing the operation, and performs parallel operations on data to be operated by utilizing FPUs of other single processor cores in the any one group according to the instructions.

8. The multi-processor system of claim 7, wherein the controller of the single processor core set as the master acquires control rights of functional blocks necessary for the operation of the FPUs from the other single processor cores in the any one group, and controls the functional blocks.

9. The multi-processor system of claim 7, wherein a controller of the other single processor cores in the any one group transitions functional blocks not related to the parallel operations to an inactive state according to the group setting.

10. The multi-processor system of claim 7, wherein the controller of each of the plurality of single processor cores includes:
    a data cache for storing all data necessary for the operation of the FPU; and
    a cache and register controller that fetches data necessary for the operation of the FPU from the data cache in each cycle and stores them in a plurality of registers for each cycle,
    wherein the controller of the single processor core set as the master in the any one group activates interfaces between the cache and register controller of the single processor core set as the master in the any one group and the cache and register controllers of the other single processor cores in the any one group.

11. The multi-processor system of claim 10, wherein the cache and register controller of the single processor core set as the master in the any one group transfers instructions to be operated by the other single processor cores to the cache and register controllers of the other single processor cores in the any one group through the activated interfaces.

* * * * *